United States Patent [19]

Hull

[11] 4,383,935
[45] * May 17, 1983

[54] MOBILE FOAM BRUSH WASHING SYSTEM INCLUDING MIXING APPARATUS FOR FOAM GENERATION

[76] Inventor: Donald A. Hull, 6660 Woodman Ave., #105, Van Nuys, Calif. 91405

[*] Notice: The portion of the term of this patent subsequent to Dec. 28, 1999, has been disclaimed.

[21] Appl. No.: 319,274

[22] Filed: Nov. 9, 1981

Related U.S. Application Data

[63] Continuation-in-part of Ser. No. 148,563, May 9, 1980.

[51] Int. Cl.³ .................... B01F 5/06; B05C 9/02; B08B 13/00
[52] U.S. Cl. .................... 252/359 E; 15/DIG. 2; 134/123
[58] Field of Search .......... 252/359 R, 359 A, 359 D, 252/359 E; 261/DIG. 26; 366/336, 338, 339; 239/343, 346, 370; 134/36, 45, 123; 422/133; 15/DIG. 2

[56] References Cited

U.S. PATENT DOCUMENTS

| | | | |
|---|---|---|---|
| 1,457,895 | 6/1923 | Campanella | 261/DIG. 26 |
| 2,715,045 | 8/1955 | Thompson | 239/343 |
| 3,430,865 | 3/1969 | McDougall | 261/DIG. 26 |
| 3,453,678 | 7/1969 | Gehman et al. | 252/359 E |
| 3,618,713 | 11/1971 | Batchelor | 261/DIG. 26 |
| 3,618,856 | 11/1971 | Sachnik | 252/359 E |
| 3,801,015 | 4/1974 | Hayes | 261/DIG. 26 |
| 3,853,784 | 12/1974 | Rogers | 252/359 E |
| 4,030,665 | 6/1977 | Koyama | 261/DIG. 26 |
| 4,135,270 | 1/1979 | Miner | 15/DIG. 2 |

FOREIGN PATENT DOCUMENTS 11381 5/1980 European Pat. Off. ........ 252/359 E
137406 9/1979 German Democratic Rep. .

Primary Examiner—Bradley Garris
Attorney, Agent, or Firm—Don B. Finkelstein

[57] ABSTRACT

A device for generating a foam which might be used, for example, as a cleaning fluid. As depicted, the device comprises structure which accepts a combined fluid, such as water, soap, and air, and passes it through a pair of turbulators in series. As it enters the first turbulator, the fluid is forced to turn through a turbulence-generating angle. The first turbulator may be substantially filled with a turbulence-generating material providing a plurality of randomly sized and randomly oriented interstices through which the fluid must pass in traversing the turbulator. The turbulence-generating material might, for example, comprise a material such a metallic or plastic turnings which are gathered together and fixed in place. Fluid discharged from the first turbulator then travels in a relatively quiescent flow through a pipe or tube to a second turbulator which may employ the same type of material to generate additional turbulence in the flow and thus assure complete mixing. Preferably, the material in the second turbulator is packed at about the same density as that in the first turbulator, but the second turbulator has a larger volume to allow the foam to expand. The device may be mounted upon a movable cart which also supports a battery-driven air compressor, a source of soap, and hoses and lines for connection of the device to a water spigot or hose bib. The cart may also support a battery and a battery charger, as well as a rinse hose and a wax applicator.

14 Claims, 6 Drawing Figures

MOBILE FOAM BRUSH WASHING SYSTEM INCLUDING MIXING APPARATUS FOR FOAM GENERATION

RELATED APPLICATIONS

This application comprises a continuation-in-part of U.S. application Ser. No. 148,563, filed May 9, 1980 and entitled "MIXING APPARATUS FOR FOAM GENERATION".

BACKGROUND OF THE INVENTION

The present invention relates to a device for thoroughly mixing a plurality of elements or materials which are in a combined fluid flow. More specifically, it is currently envisioned that a device formed in accordance with the present invention will be utilized to combine fluids such as water, soap, and air to generate a high quality, relatively dry cleansing foam which might be used, for example, to clean vehicles, walls, etc. In other words, it is intended that the invention be capable of producing a relatively dry foam which remains dry even when it is moved a long distance from the generator. Nevertheless, it will be realized by those skilled in the art that the invention can be employed to thoroughly mix any combined fluid, regardless of the ultimate use of the fluid. For most purposes, however, it will be preferred that the foam be as dry as possible, i.e., have maximum expansion. In other words, if, for example, a foam is to be used as a car washing agent, it is preferred that the foam be as dry (expanded) as possible when it reaches the washing brush or application tool.

For the purposes of this disclosure, a combined fluid will be considered to be any fluid having distinct elements, e.g., soap, air, and water, which are inefficiently or not well mixed.

In the past, a wide variety of devices have been developed to mix the distinct elements in a combined fluid for one purpose or another. Such devices have often employed pumps, mixing tanks, turbulence-generating structures and machinery, etc. In most instances, the devices produced marginally satisfactory mixing, were relatively expensive, or required relatively large amounts of chemicals and/or air to produce the desired foam. In some cases, even if a good, relatively dry foam was produced, the structure was such that the foam became compressed and very wet prior to reaching the point of its use. Finally, some prior art mixers require the use of structural production materials which cause the devices to require frequent maintenance in order to produce a consistent fluid mixture.

One application for such a mixing device has recently been found in car washes and, more particularly, in self-service car washes in which the owner of the car uses a brush, mounted on a wand, to spread and rub a cleaning fluid on his car. In those applications, the car wash builder and/or owner usually provides a source of water mixed to some extent (usually poorly) with a soap. This fluid can be discharged through the wand and applied to the surface of the car to be washed. In most cases, the soap is drawn through a venturi or similar device into the water as the water passes the soap reservoir. This results in an inefficient mixture containing very little, if any, cleansing foam. Consequently, customers of such car washes are relatively dissatisfied with the results they achieve and often must pay for successive uses of the machine for a single washing. When this occurs, the customer usually does not patronize that establishment again.

As a result, a need has arisen for a device which can be utilized to mix a combined fluid, such as soap and water, preferably with air, to produce an efficiently or thoroughly mixed fluid in the form of a rich, dry, cleansing foam in a simple, economical, maintenance-free manner.

Another application for such a device exists in the requirement for a mobile car wash system which may be used, for example, on a lot of a new or used car dealer, at a factory storage area, for fleet washing, etc. For example, when a large number of cars sit out on a dealer's lot for a few days, they become quite dusty and dirty, and, consequently, less visually attractive to prospective buyers. This fact has caused most dealers to wash the cars on their lots nearly every morning. In turn, this requires either several people to do the washing or an undesirably long time if anything more is to be done than simply rinsing the cars down with a hose. In other words, the washers must continuously change the wash water and soap, etc.

Thus, a need has also arisen for apparatus which can be employed by a single person to wash a large number of cars in a relatively short period of time and still do a thorough job so that the car may be presented to a purchaser, renter, etc., in as clean a condition as possible.

SUMMARY OF THE INVENTION

The present invention relates to a mixing device which may be employed to thoroughly mix a combined fluid. As stated previously, as the term is used in this document, a combined fluid may be considered to be a fluid made up of several distinct fluids or elements which are inefficiently and/or ineffectively mixed. In its currently envisioned use, the invention may be employed, for example, to produce a thorough and efficient mixture of air, water, and chemical such as, for example cleaning fluid. The thoroughness of the mixture will be evidenced, for example, by the production of a high quality foam which may be used as a cleaning agent for automobiles, walls, floors, or any other object to be cleaned.

In its most basic sense, it is currently envisioned that the invention may be employed in an apparatus for generation of relatively severe turbulence in a combined fluid as it travels toward the application tool for delivery to the object to be cleaned.

In its presently preferred embodiment, the device comprises a flow control system having two turbulators. The first turbulator, which receives a combined fluid of soap, air, and water, accepts the fluid in such a manner that the fluid enters the turbulator by being turned through a turbulence-generating angle. It is presently preferred that the angle be approximately 90°, although any angle which will cause the fluid to enter into turbulant flow may be employed. It is preferred, of course, that the turbulence be maximized utilizing readily available materials.

The first turbulator comprises a predetermined volume which is substantially filled with a structure which produces a large plurality of randomly sized and randomly oriented interstices through which the fluid must pass. For example, the material in the turbulator could be a commonly available plastic or metallic pot and pan scrubbing pad comprising a randomly oriented group of thin, flexible turnings, or any device having a similar configuration. Such devices resemble, for example, metal lathe cuttings which are tightly interwoven and twisted together. In any event, the turbulence-generating material in the first turbulator will cause the total fluid to be broken up into a substantial number of distinct flows, each of which passes through an interstice. The distinct flows will be combined with other flows after passing through each opening, and then will be re-divided as they travel through the next openings. Thus, the fluid will be continously broken up and re-combined, generating a very thorough mixture.

As the fluid is discharged from the first turbulator, it preferably travels upwardly in a relatively quiescent flow and enters a second turbulator in which the process is repeated in a similar turbulence-creating material. When the fluid is discharged from the second turbulator, it may be transferred to the application tool for the desired use.

In the embodiment which is presently preferred, the direction of travel between the turbulators will be substantially vertical so that a foam which is generated in the first turbulator will flow upwardly and not become trapped within the system and will have a natural flow which will resist compression. Also, the porous material in the second turbulator will preferably be packed at about the same density as that in the first turbulator. However, it is preferred that the volume within the second turbulator be larger than that in the first turbulator in order to allow continued expansion of the foam. This relationship of the sizes, or average size, of the interstices will insure the production of a thorough mixture and the discharge of a high quality foam from the second turbulator. Thus, the foam fluid discharged from the first turbulator will be more thoroughly broken up and mixed in the second turbulator to improve the foam quality.

Although the present invention may be employed in self-service car washes, full service car washes, or any other desirable application, it is currently envisioned that it may also be employed in a mobile configuration which can be mounted for easy movement on a device such as a dolly, a hand cart, or other similar vehicle. Of course, the apparatus can be structured with integral wheels so as to be pushed around the parking lot, etc. In this preferred embodiment, a cart or similar device may be provided upon which the foam generator described previously may be mounted in a fixed position, preferably arranged so that, when the cart is being used by someone washing a car or other object, the generator will be in a vertical position. The outlet of the generator may comprise a flexible hose connected to the handle of a brush for the application of foam to the object to be washed. The inlet to the generator may comprise structure for the delivery of air, soap, and water to the first turbulator. The cart may support a source of air such as, for example, a twelve volt air compressor which is powered by a battery through an on-off switch. Soap may be provided from any convenient source, such as a bottle or container having a suitable line or hose extending from it. Similarly, water may be provided from a container mounted on the cart or, alternatively, by means of a hose long enough to extend from the cart to a water spigot which is permanently fixed at some convenient location.

In this embodiment, for example, water may delivered to the cart through a hose to, for example, a three-way valve, or alternatively, a separate water control valve with separate valves controlling flow to the foam generator and the rinse nozzle. When the operator wishes to wash something, the three way valve may be opened to deliver water through a line through suitable combining structure, such as a venturi valve which will inject soap from the container into the water. Air from the air compressor may be combined with the water and soap through a regulator and check valve and this combined material can then be delivered to the first turbulator through suitable connections.

If desired, the three-way valve may be actuated to a position in which water is not delivered to the generator but, rather, is delivered to another hose connected to a water spray nozzle, for use when the foam is to be rinsed from the object which has been washed. Also, if desired, a container holding a liquid wax may be connected to the rinsing hose by means such a venturi, for applying wax when the object is being rinsed.

With this embodiment, it is presently preferred that the cart also permanently support a battery charger connected to the twelve volt battery. When the use of the cart has been completed, the battery can be recharged so that the cart can be employed at a later time.

With this embodiment of the present invention, the foam generator may be employed in a mobile unit which will allow a single person to wash a large number of machines, windows, cars, etc., rapidly with a device which provides a high volume of high quality foam, as well as a rinsing system. The device will thus eliminate the need to have either several people do the job or one person take an undesirably long time to do it.

Upon review of the following Detailed Description, taken together with the accompanying drawings, those skilled in the art will realize that the present invention may be employed in a wide variety of embodiments, many of which may not even resemble that described and depicted here. Nevertheless, it should be borne in mind that the description and accompanying drawings are merely illustrative of the principles of the present invention and only set forth the best mode presently known for accomplishing it. They are not intended to delimit the scope of the invention which is defined and limited only by the appended claims.

DETAILED DESCRIPTION

Figure 1:
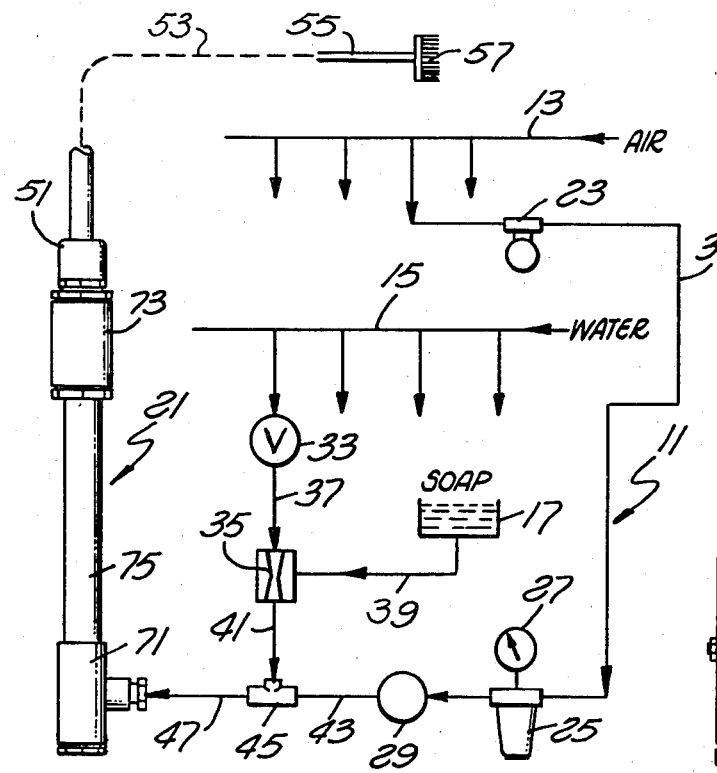
FIG. 1 comprises a schematic illustration of a mixing system employing a device utilizing the present invention.

Referring now to FIG. 1, the preferred embodiment of the present invention is depicted as a part of a schematically illustrated system 11 including an air source 13, a water source 15, and a cleaning fluid or soap source 17. As depicted, the air and water sources may comprise manifolds or headers to which a large number of foam generators, one of which is illustrated at 21 may be connected. Thus, air from the manifold 13 may be passed through a control valve 23, a pressure regulator valve 25 having a gauge 27, and a check valve or one-way flapper valve 29, via a pipe or a tube 31. Similarly, the water in manifold 15 may be passed through a pressure control valve 33 and a venturi 35, via a line 37. The soap may flow through a line 39 under the force of gravity, for example, to the venturi 35. Thus, the soap will be entrained into the water, forming a combined fluid which is relatively poorly mixed. The combined fluid of water and soap may then move through a line 41; the air may pass through a line 43; the two fluids may then combine in a "T" 45 which may, if desired, be formed so as to also produce a venturi effect. The combined fluid of air, water, and soap will then pass through a line 47 to the foam generator 21.

The foam discharged from the foam generator, which will be more completely described below, may pass through a line 53 which, preferably, is at least partly flexible near its outer end, to a cleaning tool 55. The tool may, for example, include a brush 57 through which foam will be forcibly discharged for use as a cleaning agent.

It should be realized by those skilled in the art that the system depicted in Fig. 1 may be employed with a substantial number of foam generators. For example, if such a system were employed in a self-service car wash, a generator could be provided for each bay, with all generators being fed from a single air manifold, a single water manifold, and/or a single soap reservoir. In other words, the number of generators which can be serviced by the fluid sources is limited only by the amount of pressure or suction which can be exerted upon the fluid in each of the sources to ensure the proper production of a combined fluid.

Figure 2:
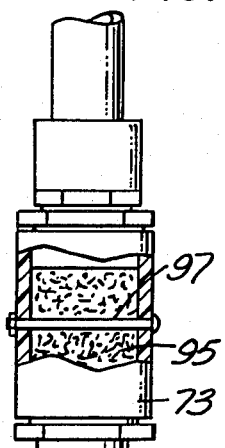
FIG. 2 comprises an enlarged view of the mixing apparatus depicted in the system of FIG. 1.

Referring now to FIG. 2, the foam generator 21 is shown in greater detail as including the first turbulator-expansion chamber, 71, a second turbulator-expansion chamber, 73, and a pipe or tube 75 extending between and connecting the turbulators for fluid communication and serving as an intermediate expansion chamber for foam being discharged from the first turbulator.

Figure 3:
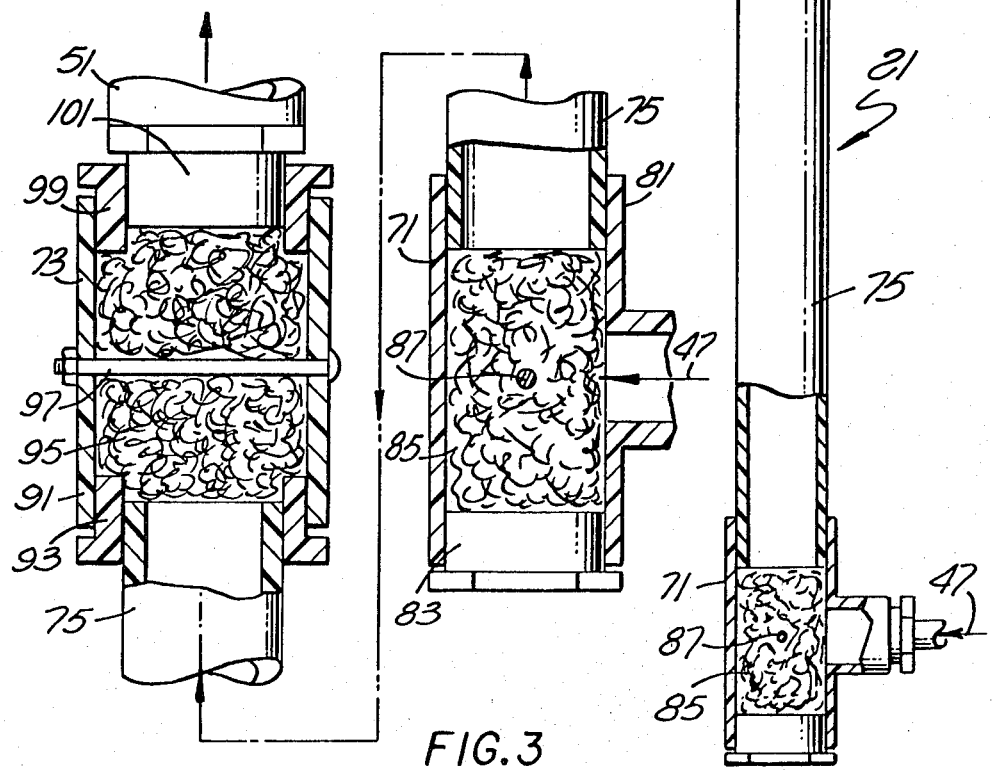
FIG. 3 comprises a further enlarged view of the turbulators employed in the mixing apparatus.

Referring to the greater detail shown in FIG. 3, it can be seen that the first turbulator 71 may, for example, comprise a "T" 81 having a plug 83 properly sealed in one end thereof, and the pipe 75 sealed in the other end thereof. The line 47 preferably comprises the perpendicular leg of the "T" so that fluid entering the "T" is forced to make a sharp, approximately 90°, turn as it enters and passes through the "T" toward the pipe 75.

Although in each of the figures, the angle of fluid travel change at the first turbulator is approximately 90°, it should be understood that any suitable angle which will generate turbulence in the fluid will be acceptable; the only requirement is that it is preferred that as much turbulence be generated as possible. In most instances, the 90° angle will be selected simply because most readily available parts are formed at that angle. In any event, the cross-sectional area of turbulator 71 is, preferably, greater than that of line 47 so that the turbulator also acts as an expansion chamber. As shown in the drawing, each expansion chamber is uniform in cross-sectional area and has a predetermined volume. Thus the fluid from line 47 will expand into turbulator 71, then into the larger diameter turbulator 73. In this manner, the device preferably provides three distinct expansion stages.

Within the turbulator 71, a turbulence-generating material 85 may be provided which, preferably, may be held in place by any suitable means, such as a bolt 87 which passes through the walls of the turbulator as illustrated.

In the presently preferred embodiment, the turbulence-generating material 85 may comprise, or resemble, a plastic or metallic device such as a pot and pan scrubbing pad or cleaner, preferably a bronze device for longer service life. A commonly available product which resembles the preferred materials is available under the trademark "CHORE GIRL." It will be recalled that such pads resemble a "ball" of a bronze metal lathe or milling machine cuttings or turnings, each individual cutting being very long and tightly curled.

The material 85 may be packed within the volume of the "T" 81 in the position illustrated, thus providing a large plurality of interstices which are randomly oriented and randomly sized. With this structure, fluid entering the "T" through the line 47 will be broken up into distinct flows, or units of flow, each unit passing through a different interstice. Each flow unit will collide and combine with adjacent flow units and the combined flow units will again be re-divided, broken up, divided again, etc., until the fluid reaches the pipe 75 and is discharged from the turbulator. As a result, the combined fluid entering the turbulator 71 will undergo a significant amount of turbulence, both as a result of the turbulence-generating angle change of flow direction, as well as the severe turbulence generated by the material 85. If the entering fluid includes air, the discharged fluid will be in the form of a foam. However, even though this foam will comprise a much better fluid mixture than can be found at the turbulator 71 intake, it will still be rather wet and somewhat compressed.

As the high quality, but wet, foam enters the pipe-expansion chamber 75, the flow will be relatively quiescent, compared to the turbulence within the turbulator. Preferably, the generator 21 will be substantially vertically oriented to take advantage of the natural tendency of the foam to travel upwardly and expand through the pipe 75 toward a second turbulator 73. Consequently, none of the fluid will have an opportunity to be trapped anywhere within the generator. Since this vertical orientation will allow the foam to expand as it is discharged from the turbulator 71, and since there is nowhere for the foam to become trapped, little or no foam compression will take place in the pipe. Stated in other words, the foam quality improvement which occurs due to the turbulator 71 will not be degraded by compression of the foam as it passes through pipe 75.

The pipe 75 may be used in the manner shown to transfer the premixed, wet foam fluid into the interior volume of a nipple or coupling 91 of a second turbulator 73. As illustrated, the pipe 75 may be sealed to the coupling 91 by means of an intermediate coupling 93. In any event, the interior of the coupling 91 may be provided with a turbulence-generating material 95 similar to material 85 in the first turbulator. The material 95 may be held within the second turbulator 73 by any suitable means, such as a bolt 97 which is fixed to the wall of the coupling 91 as illustrated in FIG. 3.

Preferably, the internal diameter of turbulator 73 is greater than that of either pipe 75 or the first turbulator 71. The turbulence-generating material 95 is preferably at about the same density at the material 85 in turbulator 71, thus allowing turbulator 73 to act as both a further expansion chamber and a fluid mixer. In other words, turbulator 73 will not restrict the fluid discharged from pipe 75 and no foam compression will occur in that turbulator even though it contains turbulence-generating material 95. The interstices of material 95 will be about the same size as those of material 85, although there will be about twice as many of them. As a result, material 95 will serve to allow or cause further expansion and drying of the foam. Consequently, the fluid leaving the second turbulator, via a coupling 99 and a nipple 101 which directs the fluid toward the discharge line 51, will be very high quality foam which is an excellent cleansing agent.

Simply by way of illustration, it is presently envisioned that the amount of turbulence-generating material 95 in turbulator 73 will be approximately twice the amount of material 85 in the turbulator 71, whether by volume or by weight. Thus, if the interior volume of the second turbulator 73 is twice that of the first turbulator 71, the amount of material 95 may be twice that of material 85 and no flow restriction will be created. Through experimentation, it has been found that this is the optimum ratio of material to produce a high quality foam, although any ratio between 1.5 to 1 and 2.5 to 1 might be acceptable. In fact, it is quite possible that the ratio may well be modifiable in accordance with the volume of air, water, and/or soap in a selected combination, or even the particular type of soap used.

In use, the owner of the system may desire to control the air and water pressures in accordance with the water quality and hardness, as well as in accordance with the quality of the soap. Also, the air pressure may be controlled in order to select an optimum wetness of the foam. It has been found that the preferred air pressure is often between 20 and 40 PSI for generation of the soap foam. The higher the pressure, of course, the dryer the foam will be.

In one experimental system which has been constructed, the second turbulator was arranged so as to have twice the volume and amount of turbulence-generating material as the first turbulator. For example, material 95 weighed ½ ounce and material 85 weighed ¼ ounce. Pipe-expansion chamber 75 had a 1" inner diameter, and pipe or flow line 53 had a ½" inner diameter. During testing it was found that little or no foam compression occurred in line 53 even though the foam was thus transported a greater distance than possible with any known prior art device. In other words, a very dry foam was discharged at the applicator 57. Of course, if longer transport distances are necessary, it may be necessary to use a discharge line having an inner diameter greater than ½". Alternatively (or additionally), the transport distance (i.e., line 53) may be increased by increasing the air pressure. Thus, even if some foam compression may occur, the final discharged foam will still be high quality and relatively dry.

If a mixing device which is formed in accordance with the present invention is used to generate a cleansing foam, the amount of soap or cleaning fluid which must be employed will be minimized. In other words, the present invention results in a highly efficient foam generator which minimizes the volume of expensive soaps and cleaning agents for the purpose described.

Figure 4:
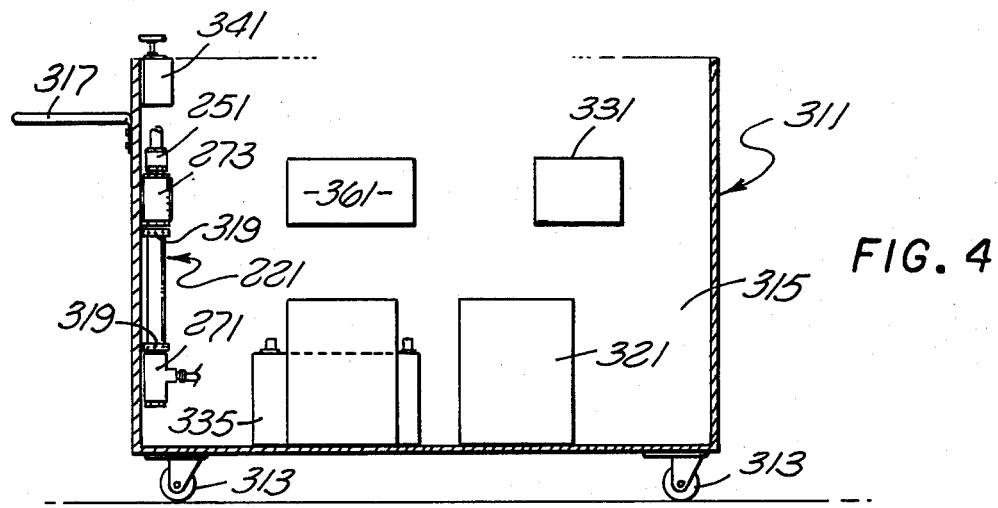
FIG. 4 comprises a sectional view of a cart employing the present invention.
Figure 5:
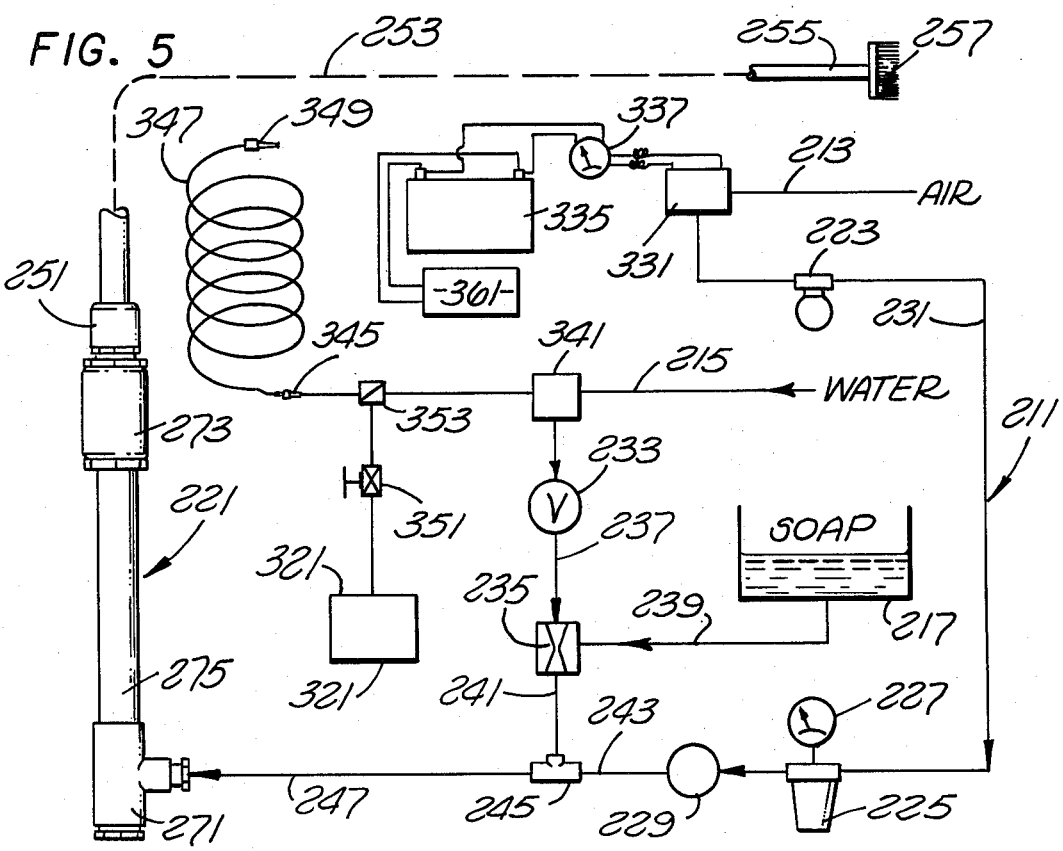
FIG. 5 comprises a schematic diagram of structure which may be employed in the present invention.

Referring now to FIGS. 4 and 5, an application for the foam generator described above is illustrated. For the sake of convenience of the reader, those elements which have previously been described with reference to FIGS. 1-3 have been similarly identified, preceded by the numeral "2". Thus, the brush is identified as 257, the generator as 221, etc. Consequently, it is not believed that it will be necessary to describe those elements again here.

As shown in FIG. 4, this embodiment of the invention may comprise a cart 311, having a set of wheels 313, a body 315, and a handle 317 for the convenience of an operator. As shown, the turbulence generator 221 may be mounted on one wall of the cart by any suitable means, such as flexible straps 319. The soap container 217 may be seated within the cart and, if desired, a wax container 321 may be similarly positioned within the body 315.

In this embodiment, air, entering the system through, perhaps, a filtered line 213 is drawn into a compressor 331 for delivery to the line 231 as previously described. The compressor may, for example, be driven by a twelve volt battery 335 via a switch 337 which the operator may employ to turn the compressor on and off. With this embodiment, the water line 215 may, if desired, be connected to a rather large tank (not shown) in the body 315 or, preferably, may be connected to a hose (not shown) which is long enough to extend to the nearest water spigot or hose bib in the area in which the cart is to be employed. If desired, the hose can be either coiled on the cart or mounted on a reel on the cart. In any event, when an operator desires to use the cart, he can connect the hose to the suitable water source and then, pushing on the handle, 317, move the cart to a location which is convenient to the object to be washed. He can then turn on the switch 337, powering the compressor 331, to force air through the generator 221 in the manner previously described. At that time, the operator can actuate a three-way valve 341, allowing the water in the line 215 to pass through the pressure control valve 233 to the venturi 235.

Thus, soap will be drawn from the container 217 through the line 239 and the soap and water will be combined with the air at the "T" 245 as previously described. When the operator is through with the washing operation, he can turn off the switch 337 and actuate the valve 341 to a closed position. He can then coil the hose 253 in a convenient position on the cart. If desired, the operator may actuate the valve 341 to a third position in which the water will pass through a line 345 to a hose 347 so that the operator may actuate a spray nozzle 349 and thus rinse off the object being washed. If the object which has been washed is a car, for example, the operator may actuate a valve 351 so that liquid wax in the container 321 will be drawn through a venturi 353 by the water in the line 345, thus causing the application of wax to the car at the same time that the car is being rinsed.

Figure 6:
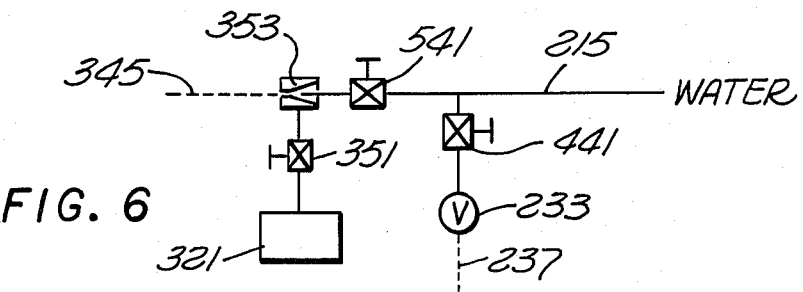
FIG. 6 comprises a partial schematic diagram of an alternate embodiment of structure which may be employed in the present invention.

Referring now to the embodiment of FIG. 6, an alternate embodiment of the invention has been schematically illustrated. Comparison of this embodiment with that of FIG. 5 will reveal that those portions of the invention which are similar or identical to those depicted in FIG. 5 are provided with the same identification numerals and, thus need not be described again.

In this embodiment, however, the water entering the system through line 215 passes to a pair of similar valves 441 and 541, either or both of which may be open or closed. If valve 441 is opened, water will pass through the pressure control valve 233 for the production of foam within the generator 221 in the manner previously described.

On the other hand, if valve 541 is opened, water will pass through the venturi 353 for use in the spray nozzle 349, again as previously described.

Thus, with this simplified embodiment, an equal result may be achieved at a lower cost with no significant reduction in convenience. In fact, if the water pressure is sufficiently high, this embodiment may be employed to speed up a washing operation by permitting one employee to wash. A second employee can rinse and wax while the first moves to the next item to be washed.

When the operator has completed washing all of the cars or other objects, he can recoil all the hoses on the cart and push the cart back to a storage location. In order that the cart will be ready for use the next time it is needed, the operator can then insert a plug (not shown) of a battery charger 361 into a convenience outlet, causing the battery 335 to be recharged.

With structure as thus described, a very simple and compact portable unit can be employed by a single operator to wash a great number of cars (or other objects) at a rapid rate. The portable unit is entirely self contained so that the operator's work, other than the actual washing, is reduced to filling the receptacles 217 and 321, attaching the water hose to a spigot, pushing the cart to the desired location, coiling the hoses and disconnecting the water hose when the work is done, and connecting the battery charger to a wall outlet. Since the operator is, essentially, bringing all of his equipment with him when he pushes the cart to the desired location, it will be unnecessary for him to make frequent return trips to the service area for soap and wax. The use of the foam generator, the details of which were specifically described previously, allows a single operator to utilize a foam of very high quality to wash cars or other such objects at a rate equal to or greater than has been possible with several washers working together in the past. Thus, the cost of washing cars in such operations will be significantly reduced. At the same time, the quality of the work will, in most instances, be just as significantly increased.

Having now reviewed this Detailed Description and the drawing of the presently preferred embodiment, those skilled in the art will realize that these merely constitute an introduction to the invention rather than its delimitation. It must be kept in mind that the scope of the invention, as set forth in the following claims, is broad enough to encompass a substantial number and wide variety of embodiments, many of which may not even resemble that depicted and described here. Nevertheless, such additional embodiments will employ the spirit and scope of the invention which will be established only by the following claims.

What is claimed is:

1. A mobile apparatus for providing a foam from a mixture of fluids, and comprising, in combination:
    a mobile cart;
    water supply means on said cart for receiving water at a predetermined pressure;
    fluid chemical container means on said cart for storing a supply of fluid chemical;
    venturi means operatively connected to said water supply means and said fluid chemical container means for mixing water and fluid chemical in a predetermined ratio to provide a fluid chemical-water mixture;
    air supply means mounted on said cart for providing compressed air;
    mixing means mounted on said cart and operatively connected to said air supply means and to said venturi means for mixing said compressed air and said fluid chemical-water mixture in a predetermined ratio to provide a combined fluid mixture of air, water, and chemical;
    foam generator means mounted on said cart for receiving said combined fluid mixture of air, water, and chemical to generate a foam therefrom, said foam generator means comprising:
        a fluid inlet for receiving said combined fluid mixture of air, water, and chemical;
        a first expansion turbulator connected to said fluid inlet and said first expansion turbulator having means for generating a turbulence in said combined fluid mixture flowing through said first expansion turbulator;
        relatively quiescent flow path expansion means for receiving fluid which has traversed said first expansion turbulator;
        second expansion turbulator having means for generating a turbulence in the fluid flow therethrough in fluid communication with said flow path expansion means for receiving fluid flow therethrough;
        a fluid outlet means connected to said second expansion turbulator for receiving fluid flowing therefrom, and said second expansion turbulator having a larger cross-sectional dimension than said flow path expansion means, and said second expansion turbulator having a larger cross-sectional dimension than said first expansion turbulator.

2. The arrangement defined in claim 1 and further comprising:
    a brush means flexibly connected to said fluid outlet means of said foam generator means for receiving the foam from said fluid outlet means of said foam generator means and dispensing said foam in regions adjacent said brush means.

3. The arrangement defined in claim 2, wherein:
    said air supply means further comprises:
        an air compressor.

4. The arrangement defined in claim 3, wherein said air supply means further comprises:
    electric motor means for driving said air compressor.

5. The arrangement defined in claim 4, wherein said air supply means further comprises:
    battery means mounted on said cart for powering said electric motor means; and
    switch means operatively connected between said battery means and said motor means for selectively energizing said motor means.

6. The arrangement defined in claim 1, and further comprising:
    wax container means mounted on said mobile cart for storing a supply of fluid wax; and
    wax mixing means operatively connected to said wax container means and to said water supply means for mixing said wax and said water in a predetermined ratio; and
    hose means for receiving said mixture of wax and water to allow dispensing thereof in regions spaced from said cart.

7. The arrangement defined in claim 6, and further comprising:
    water valve means having an off position to prevent the flow of water therethrough, an inlet port operatively connected to said water supply means, a first outlet port, and a second outlet port, said water valve means selectively directing water through said first outlet port and said second outlet port; and said first outlet port of said water valve means operatively connected to said venturi means.

8. The arrangement defined in claim 7, wherein:

said hose means is operatively connected to said second outlet port of said water valve means for receiving water to allow dispensing thereof in regions spaced from said cart;

said wax mixing means is connected between said hose means and said second outlet port of said water valve means;

and further comprising:

wax valve means operatively connected between said wax container means and said wax mixing means for selectively allowing flow of wax to said wax mixing means.

9. The arrangement defined in claim 8 and further comprising:

a brush means flexibly connected to said fluid outlet means of said foam generator means for receiving the foam from said fluid outlet means of said foam generator means and dispensing said foam in regions adjacent said brush means.

10. The arrangement defined in claim 9, wherein:

said air supply means further comprises:

an air compressor.

11. The arrangement defined in claim 10, wherein said air supply means further comprises:

electric motor means for driving said air compressor.

12. The arrangement defined in claim 11, wherein said air supply means further comprises:

battery means mounted on said cart for powering said electric motor means; and switch means operatively connected between said battery means and said motor means for selectively energizing said motor means.

13. The arrangement defined in claim 1, and further comprising:

water valve means having an off position to prevent the flow of water therethrough, an inlet port operatively connected to said water supply means, a first outlet port, and a second outlet port, said water valve means selectively directing water through said first outlet port and said second outlet port; and said first outlet port of said water valve means operatively connected to said venturi means.

14. The arrangement defined in claim 13, and further comprising:

hose means operatively connected to said second outlet port of said water valve means for receiving water to allow dispensing of water in regions spaced from said cart.

* * * * *